United States Patent
Schmidt et al.

(10) Patent No.: US 7,603,555 B2
(45) Date of Patent: Oct. 13, 2009

(54) PROVIDING TOKENS TO ACCESS EXTRANET RESOURCES

(75) Inventors: Donald E. Schmidt, Redmond, WA (US); Ryan D. Johnson, Bothell, WA (US); Kahren Tevosyan, Kirkland, WA (US); Jeffrey F. Spelman, Woodinville, WA (US); Krishnanand Shenoy, Bothell, WA (US); Harini Raghavan, Bellevue, WA (US); David R. Mowers, Issaquah, WA (US); Matthew Hur, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 826 days.

(21) Appl. No.: 11/173,004

(22) Filed: Jun. 30, 2005

(65) Prior Publication Data

US 2006/0123234 A1 Jun. 8, 2006

Related U.S. Application Data

(60) Provisional application No. 60/634,356, filed on Dec. 7, 2004.

(51) Int. Cl.
*H04L 9/00* (2006.01)
(52) U.S. Cl. .................... 713/168; 713/150; 713/151
(58) Field of Classification Search ............... 713/168, 713/150, 151
See application file for complete search history.

(56) References Cited

U.S. PATENT DOCUMENTS

| | | | |
|---|---|---|---|
| 5,684,950 A | 11/1997 | Dare et al. |
| 5,768,503 A | 6/1998 | Olkin |
| 5,815,665 A | 9/1998 | Teper et al. |
| 5,991,802 A | 11/1999 | Allard et al. |
| 6,067,623 A | 5/2000 | Blakley, III et al. |
| 6,141,758 A | 10/2000 | Benantar et al. |
| 6,178,511 B1 | 1/2001 | Cohen et al. |
| 6,195,682 B1 | 2/2001 | Ho et al. |
| 6,219,651 B1 | 4/2001 | Bublitz et al. |
| 6,240,512 B1 | 5/2001 | Fang et al. |
| 6,243,816 B1 | 6/2001 | Fang et al. |
| 6,275,944 B1 | 8/2001 | Kao et al. |
| 6,339,827 B1 | 1/2002 | Stokes et al. |
| 6,351,819 B1 | 2/2002 | Bergland et al. |
| 6,370,561 B1 | 4/2002 | Allard et al. |
| 6,374,283 B1 | 4/2002 | Chessell et al. |
| 6,453,362 B1 | 9/2002 | Bittinger et al. |
| 6,687,831 B1 | 2/2004 | Albaugh et al. |
| 6,954,778 B2 | 10/2005 | Harjanto |
| 2002/0144108 A1 | 10/2002 | Benantar |
| 2002/0144119 A1 | 10/2002 | Benantar |
| 2002/0184507 A1 | 12/2002 | Makower et al. |

(Continued)

OTHER PUBLICATIONS

Digital signatures for flows and multicasts Chung Kei Wong; Lam, S.S.; Networking, IEEE/ACM Transactions on vol. 7, Issue 4, Aug. 1999 pp. 502-513.*

(Continued)

*Primary Examiner*—David Y Jung
(74) *Attorney, Agent, or Firm*—Merchant & Gould, P.C.

(57) ABSTRACT

A system for authenticating computer users comprising a single active directory disposed in an intranet, a web server disposed in a DMZ associated with the intranet, and a web client coupled to the web server through an internet connection that is capable of signing on to the web server.

18 Claims, 9 Drawing Sheets

U.S. PATENT DOCUMENTS

| | | |
|---|---|---|
| 2002/0194508 A1 | 12/2002 | Sanchez et al. |
| 2003/0177388 A1 | 9/2003 | Botz et al. |
| 2003/0221126 A1 | 11/2003 | Berman et al. |
| 2003/0233543 A1 | 12/2003 | Nagaratnam et al. |
| 2003/0236975 A1 | 12/2003 | Birk et al. |
| 2004/0002878 A1 | 1/2004 | Hinton |
| 2004/0030764 A1 | 2/2004 | Birk et al. |
| 2004/0128541 A1 | 7/2004 | Blakley et al. |
| 2004/0230831 A1 | 11/2004 | Spelman et al. |
| 2005/0015593 A1 | 1/2005 | Cheng et al. |
| 2005/0114701 A1 | 5/2005 | Atkins et al. |
| 2005/0223217 A1 | 10/2005 | Howard et al. |
| 2005/0277420 A1 | 12/2005 | Shin et al. |
| 2006/0021019 A1 | 1/2006 | Hinton et al. |
| 2006/0080352 A1 | 4/2006 | Boubez et al. |
| 2006/0080730 A1 | 4/2006 | Cahill |
| 2006/0112422 A1 | 5/2006 | Tevosyan et al. |
| 2006/0123234 A1 | 6/2006 | Schmidt et al. |
| 2006/0123472 A1 | 6/2006 | Schmidt et al. |

OTHER PUBLICATIONS

A design of authentication system for distributed education Suzuki, E.; Information Technology Based Higher Education and Training, 2004. ITHET 2004. Proceedings of the Fifth International Conference on May 31-Jun. 2, 2004 pp. 66-71.*

Autonomous dynamic honeypot routing mechanism for mitigating DDoS attacks in DMZ Sardana, A.; Joshi, R.C.; Networks, 2008. ICON 2008. 16th IEEE International Conference on Dec. 12-14, 2008 pp. 1-7.*

Gaedke, Martin; Meinecke, Johannes; Nussbaumer, Martin. "A Modeling Approach to Federated Identity and Access Management," Special Interest Tracks and Posters of the 14$^{th}$ International conference on World Wide Web; May 10-14, 2005; pp. 1156-1157.

Gomi, Hidehito; Hatakeyama, Makoto; Hosono, Shigeru; Fujita, Satoru. "A Delegation Framework for Federated Identity Management," Proceedings of the 2005 Workshop on Digital Identity Management DIM '05, Nov. 11, 2005, pp. 94-103.

Del Vecchio, David; Humphrey, Marty; Basney, jim; Nagaratnam, Nataraj. "CredEx: User-Centric Credential Management for Grid and Web Services," 2005 IEEE International Conferedce on Web Servicse (ICWS 2005), Orlando, FL; 2005, pp. 1-8.

Groβ, Thomas. "Security Analysis of the SAML Single Sign-on Browser/Artifact Profile," Computer Security Applications Conference, 2003; Dec. 8-12, 2003; pp. 298-307.

De Clercq, Jan; Single Sign-On Architectures; www.csat.kuleuven.ac.be/cosic/seminars/slides/sso.pdf; 2000; 30 pages.

[CatalystFedInterop] Gebel, G., "Multiprotocol Federation Interoperability Demonstration MBP", 2005, http://campaign.burtongroup.com/CT000479010TI4.html. (Dispite best efforts, a copy of the above cited reference could not be located).

Liberty Alliance Project, "Liberty ID-FF Protocols and Schema Specification, Version: 1.2-errata-v3.0," 2004, http://www.projectliberty.org/specs/draft-liberty-idff-protocols-schema-1.2-errata-v3.0.pdf.

Microsoft Corporation, "Domain Controllers," http://www.microsoft.com/windows2000/en/advanced/help/sag_ADintro_26.htm?id=289.

IBM, Microsoft Corporation, "Passive Requestor Federation Interop Scenario Version 0.4," Feb. 2004, ftp://www6.software.ibm.com/software/developer/library/ws-fpscenario2.doc.

Dierks, T.; Allen, C. "The TLS Protocol Version 1.0," RFC 2246, Jan. 1999, http://www.ietf.org/rfc/rfc2246.txt.

Kristol, D.; Montulli, L. "HTTP State Management Mechanism," RFC 2965, Oct. 2000, http://www.ietf.org/rfc/rfc2965.txt.

Jonsson, J; Kaliski, B. "Public-Key Cryptography Standards (PKCS) #1: RSA Cryptography Specifications Version 2.1," RFC 3447, Feb. 2003, http://www.ietf.org/rfc/rfc3447.txt.

Blake-Wilson, S.; Nystrom, M.; Hopwood, D.; Mikkelsen, J.; Wright, T. "Transport Layer Security (TLS) Extensions," Jun. 2003, http://www.ietf.org/rfc/rfc3546.txt.

Neuman, C., Yu, T., Hartman, S., and K. Raeburn, "The Kerberos Network Authentication Service (V5)", Jul. 2005, http://www.ietf.org/rfc/rfc4120.txt.

Hughes, J., Cantor, S., Hodges, J., et al., "Profiles for the OASIS Security Assertion Markup Language (SAML) V2.0", Mar. 2005, http://docs.oasis-open.org/security/saml/v2.0/saml-profiles-2.0-os.pdf.

National Institute of Standards and Technology, "Secure Hash Standard," FIPS 180-1, May 1994, http://www.itl.nist.gov/fipspubs/fip180-1.htm.

Freier, A.; Karlton, P.; Kocher, P. "The SSL 3.0 Protocol," Netscape Communications Corp., Nov. 1996.

"OASIS Security Services (SAML) TC," www.oasis-open.org/committees/tc_home.php?wg_abbrev=security; May 7, 2003; 4 pages.

"Liberty ID-FF Protocols and Schema Specification," www.projectliberty.org/specs/main.html; May 7, 2003; 3 pages.

Tivoli Secure Way Global Sign-On; Information Systems Mangement Canada Corporation, IBM Global Services; 30 pages; Canada.

eTrust Single Sign-On, Managing User Access in an eBusiness Environment; Computer Associates; 2000; 11 pages; Islandia, NY (Dispite best efforts, a copy of the above cited reference could not be located).

Using Tivoli Secure Way to Manage e-Business Security ; www.cio.com/sponsors/060100_tivoli.html; May 6, 2003; 9 pages.

Bajaj et al., *WS-Federation: Passive Requestor Profile* [online], Version 1.0, Jul. 8, 2003, [Retrieved Mar. 4, 2007], Retrieved from: http://msdn2.microsoft.com/en-us/library/ms951223(d=printer).aspx. [34 pages].

Berners-Lee, T., Fielding, R., Masinter, L., *Uniform Resource Identifiers (URI): Generic Syntax*, RFC 2396, Aug. 1998. [40 pages].

Berners-Lee, T., Fielding, R., Masinter, L., *Uniform Resource Identifiers (URI): Generic Syntax*, RFC 3986, Jan. 2005.

Della et al., *Web Services Trust Language (WS-Trust)*, Version 1.0, Dec. 18, 2002. [30 pages].

Fielding et al., *Hypertext Transfer Protocol—HTTP/1.1*, RFC 2068, Jan. 1997. [162 pages].

Fielding et al., *Hypertext Transfer Protocol—HTTP/1.1*, RFC 2616, Jun. 1999. [219 pages].

IBM, *Web Services Trust Language* [online], [Retrieved Jan. 31, 2008], Retrieved from: http://www.ibm.com/developerworks/library/specification/ws-trust/. [2 pages].

Kohl, J., Neuman, C., *The Kerberos Network Authentication Service (V5)*, RFC 1510, Sep. 1993. [52 pages].

Lampson et al., *Authentication in Distributed Systems: Theory and Practice*, Digital Equipment Corporation, ACM Trans. Computer Systems 10, 4, pp. 265-310, Nov. 1992. [46 pages].

Lampson, B., Rivest, R., *SDSI—A Simple Distributed Security Infrastructure*, Sep. 15, 1996. [47 pages].

Leach et al., *A Conceptual Authorization Model for Web Services*, Computer Systems: Theory, Technology, and Applications, pp. 137-146, Feb. 2003. [8 pages].

NetBSD Programmer's Manual, *Name-Service Switch* [online], [Retrieved Apr. 11, 2007], Retrieved from: http://netbsd.gw.com/cgi-bin?nsswitch.conf++NetBSD-1.4.3. [3 pages].

Oasis, *SAML* [online], [Retrieved Jan. 31, 2008], Retrieved from: http://www.oasis-open.org/committees/tc_home.php?wg_abbrev=security. [8 pages].

Paschoud, J., McLeish, S., *Managing Access to Decomate Resources*, Decomate2 Conference, Jun. 2000. [9 pages].

Secure Computing, *SafeWord PremierAccess* [online], [Retreived Oct. 19, 2007], Retrieved from: http://www.ibm.com/developerworks/library/specification/ws-trust/. [14 pages].

Sun Microsystems, *Name-Service Switch* [online], [Retrieved Jan. 31, 2008], Retrieved from: http://compute.cnr.berkeley.edu/cgi-bin/man-cgi?nsswitch.conf. [9 pages].

Security Assertion Markup Language (SAML) (No Document).

* cited by examiner

PROVIDING TOKENS TO ACCESS EXTRANET RESOURCES

CROSS-REFERENCE TO RELATED APPLICATION

This application claims the benefit of U.S. Provisional Patent Application No. 60/634,356 filed Dec. 7, 2004, the contents of which are hereby incorporated by reference.

BACKGROUND

The invention relates generally to communication networks, and more particularly to passive client single sign-on for Web applications.

In recent years, the Internet has become one of the most important tools for organizations to communicate and interact with each other. Access to a network resource by a user via the internet, or by a user in a related or federated network, are increasing. Providing user directories to accommodate an expanded group of users outside a typical network has tended to increase over time, along with the effort in maintaining these directories. For security reasons, a user in a particular organization often has to be authenticated before being granted access to resources in another organization. Different mechanisms have been developed to facilitate user authentication. One such mechanism is Web Services (WS)-Federation. WS-Federation enables the sharing of identity across enterprise boundaries using Extensible Markup Language (XML) security tokens. These XML tokens utilize formats, such as Security Assertion Markup Language (SAML) or Extensible Rights Markup Language (XrML).

Typically, the claims in the security tokens flow between a pair of enterprises. However, for security reasons resources that a web client or a network partner would access may be disposed outside of a security boundary. The establishment of a security boundary may call for a shadow directory, and a token transfer mechanism to preserve security. This arrangement typically calls for multiple sign on by a user. In a typical token exchange the originator of the tokens is called the Identity Provider. The Identity Provider owns a user's identity and authentication. The consumer of the tokens is called the Resource Provider. The Resource Provider may provide any number of Web Services or other applications. A cryptographic trust may be established between the two parties so that the Resource Provider can authenticate the Identity Provider as the authority for security tokens.

DESCRIPTION OF THE DRAWINGS

The present description will be better understood from the following detailed description read in light of the accompanying drawings, wherein.

Tokens to Access Extranet Resources

Tokens to Access Federated Resources

Figure 7:
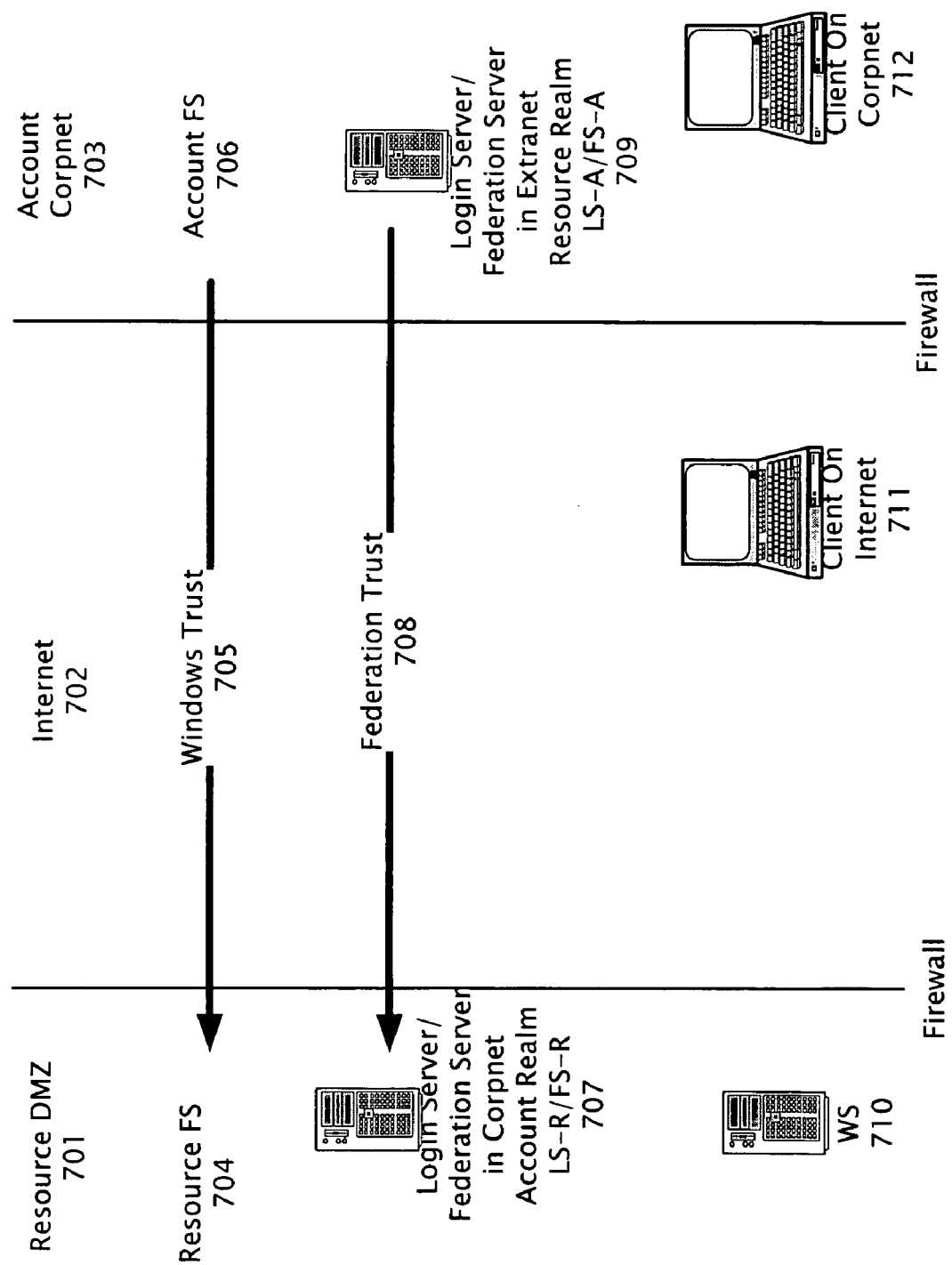
Figure 8:
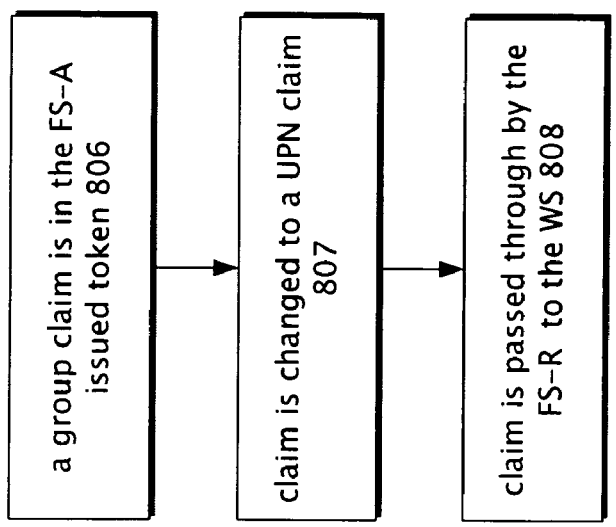
Figure 8:
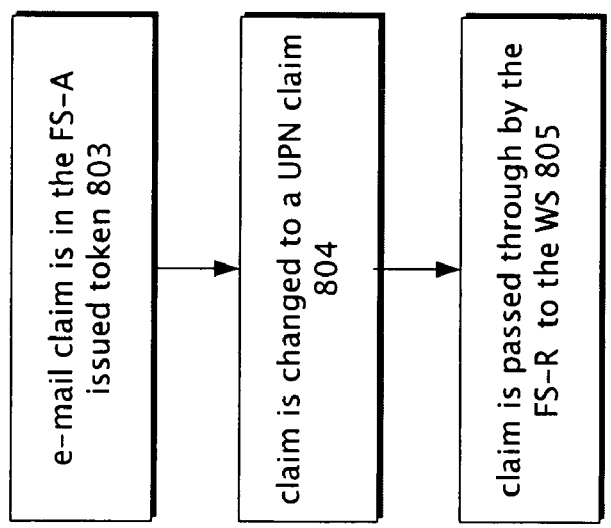
Figure 8:
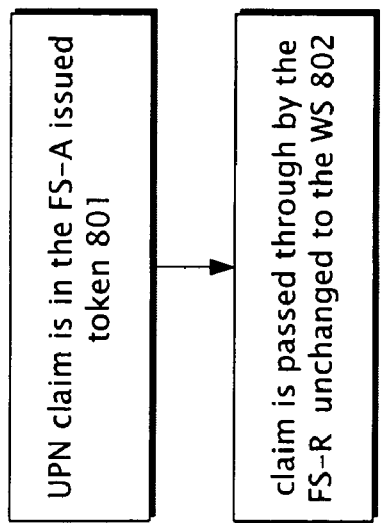

FIG. 7 is a block diagram of overall processing flow for federated partner to extranet resources FIG. 8 is a flow diagram showing three different ways to map claims to allow the generation of a NT access token that will allow access by a federation partner.

Computing Environment

Figure 9:
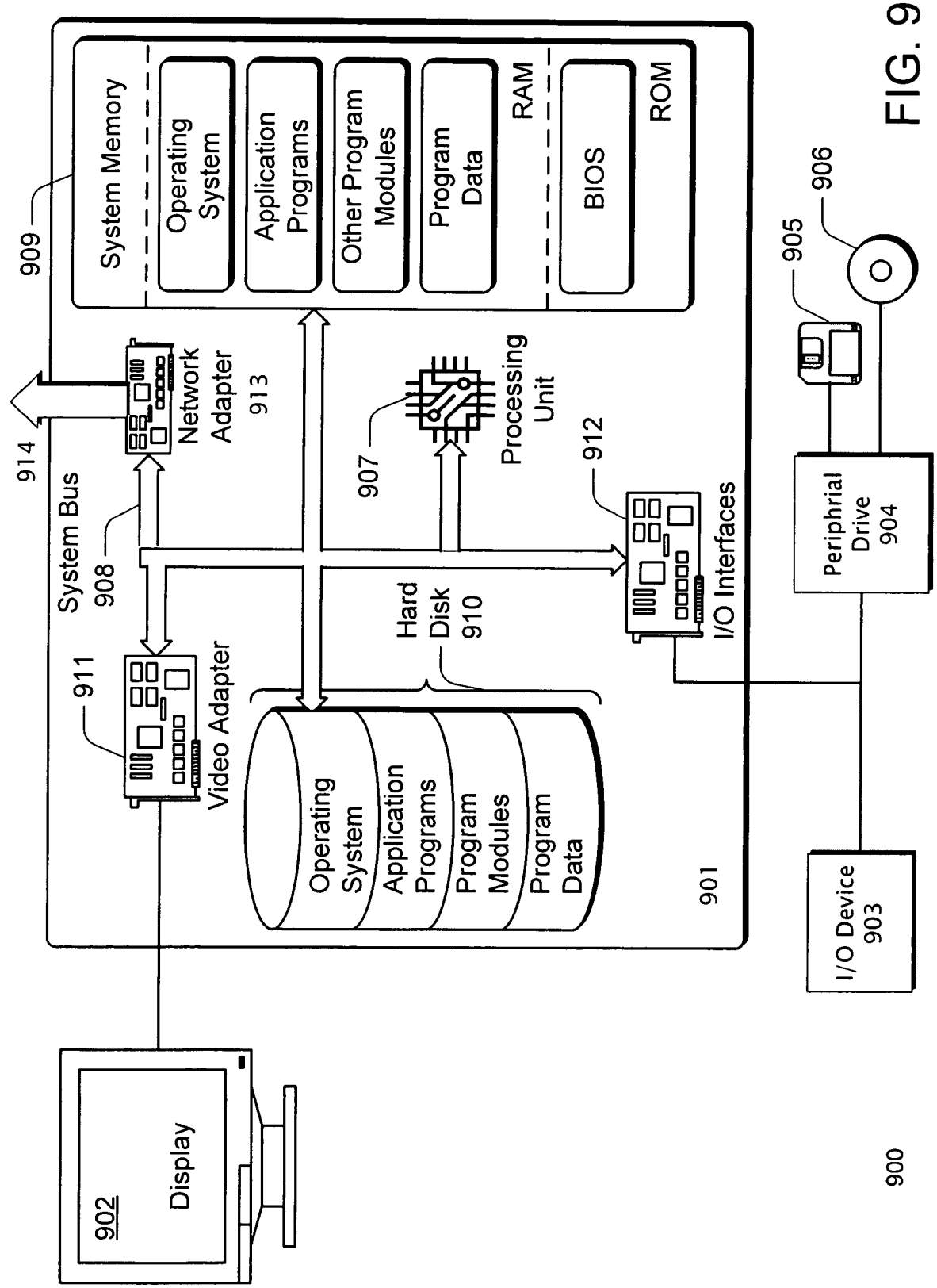

FIG. 9 illustrates an exemplary computing environment in which the web SSO described in this application and network access by a federated partner, may be implemented.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an internet system, the system described is provided as an example and not a limitation. As those skilled in the art will appreciate, the present examples are suitable for application in a variety of different types of networked systems.

There are numerous existing web applications that have been built and are currently used in corporate networks. Many of these applications use traditional Windows™ authorization mechanisms to restrict access to the applications. At the application this means getting a Windows™ token that includes Windows™ Security Identifier ("SIDs") (user SIDs and group SIDs) such that access checks may be made with this token against Windows™ based Access Control Lists ("As") that use SIDs. There is a growing trend to move applications so that they are accessible from the internet, and from the networks of corporate partners, as opposed to access only from the corporate intranet. To minimize the burden of moving these applications, minimal modifications that allow Windows™ authorization to continue to be used are made. The first step in accomplishing this typically calls for moving an application into a DMZ that quarantines the associated network from access. Because of typical security restrictions placed on the DMZ it is typically not possible to use current Windows™ authentication mechanisms to build a Windows™ token at an application in the DMZ, unless extra shadow accounts are utilized.

A shadow account is an account that is shadowing a real corporate user or partner account, for example a corporate employee has an account in the corporate network and would need an additional shadow account in the DMZ. Shadow accounts are typically provided to allow Windows™ authorization. Typically shadow accounts call for a substantial effort by an administrator to update and maintain.

Tokens are typically used to authenticate users. Active Directory Federation Services ("ADFS")™ is an example of an authentication system that provides ADFS tokens, for authentication and authorization to applications in a DMZ to exchange data. ADFS provides tokens that are different than Windows™ tokens. Windows™ tokens that provide authorization are typically referred to as NT tokens. The examples provided may allow extranet, and federated access, and may allows Windows™ tokens to be provided for applications running in the DMZ. The overall effect may be that the typical security measures, or restrictions typically utilized are not interfered with. A method of transferring security tokens is described in U.S. patent application Ser. No. 10/993,745, filed Nov. 19, 2004, and U.S. patent application Ser. No. TBD (attorney docket number 312159.01), filed May 13, 2005, the contents of which are incorporated herein by reference.

The first example of Single sign-on ("SSO") may give a computer user the ability to access various resources with a single identity, and with a single logon per session even when the user is accessing multiple applications. The first example may provide an ADFS token with additional authorization data, so that a Windows™ NT token may be constructed that will allow Windows™ authorization to be performed. Single sign on may allow the creation of NT tokens at the web agent in the absence of Active Directory accounts for users. Thus in the first example shadow accounts may be eliminated as authorization data is provided in the token. Web Single sign on ("WebSSO") is a subset of SSO that may apply only to browsable web sites. Browsable web sites may well be regarded as the dominant form of SSO today due to the popularity of the Internet.

WebSSO designs may be configured to provide protocols and token formats utilized by web services on the internet. A general description of the method is that for corporate accounts, SIDs from a corporate account forest are put into the ADFS token by a Federation Server ("FS") in the corporate network. Next, these SIDs are filtered by the FS in the DMZ, and then expanded by the ADFS web server agent at the Web Server (WS). The ADFS web server agent then builds a token from these SIDs. Note that the ADFS token is authenticated at each step along the way.

For the second example of federated partner access, or federated resource sign on, federated partners also may need Windows™ tokens in order to access these applications in the DMZ. Shadow accounts are typically required for conventional federated partners, since SIDs from a federated partner's Windows™ forest would be useless in the resource DMZ. Typically the SIDS of one network are meaningless to another network. This second example may allow web servers to use traditional Windows based authorization for federated users without shadow accounts by constructing tokens that transfer account information from the active directory 305. The process used to build Windows™ tokens for federated partners is described further below.

Furthermore, web SSO tends to facilitate identity and access management capabilities of computer operating systems. For example the example of single sign on presented here tends to reduce the overhead associated with shadow accounts by eliminating them.

Figure 1:
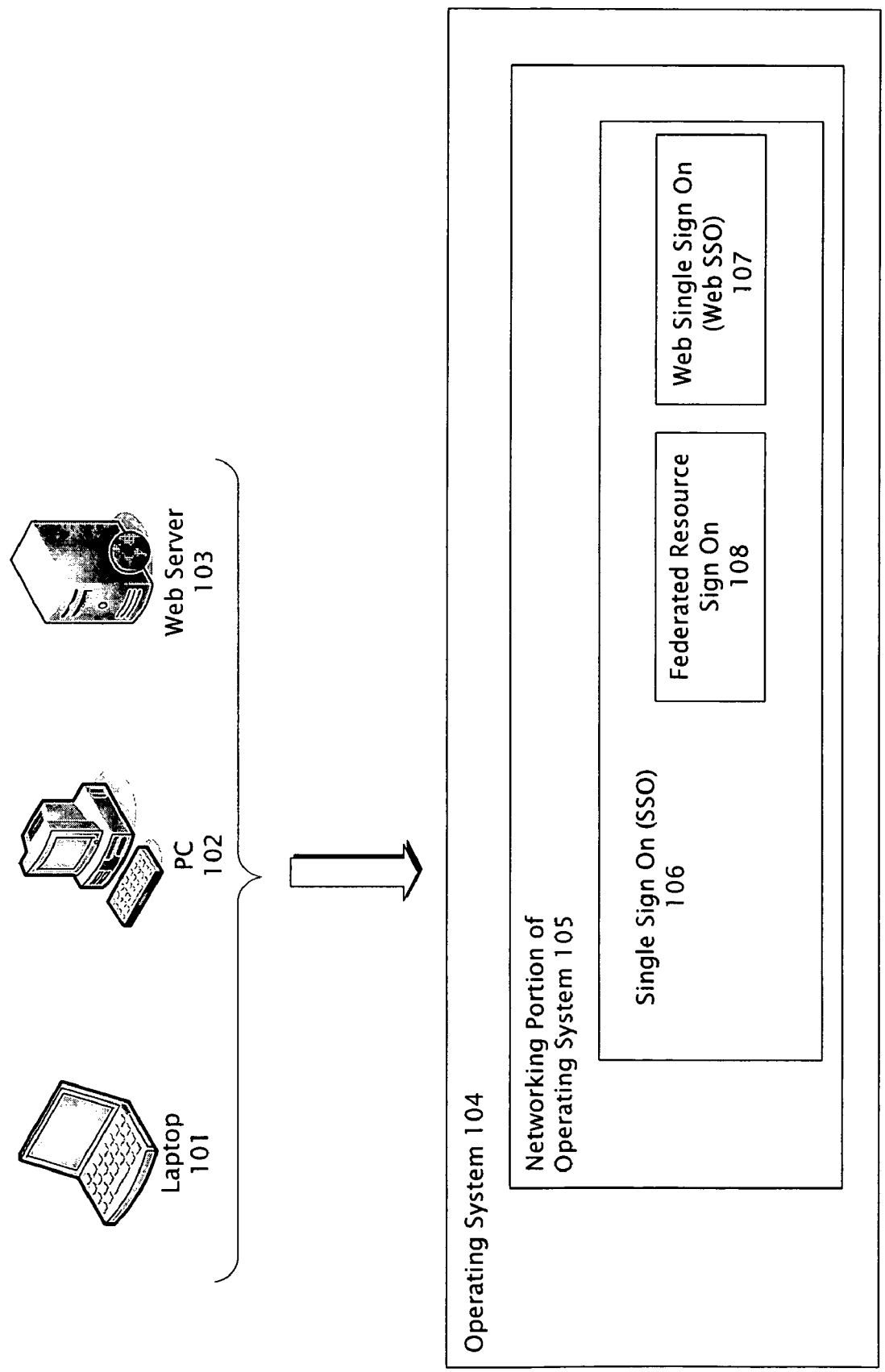
FIG. 1 shows web single sign on as a part of a computer operating system.

FIG. 1 shows single sign on 107, and federated resource sign on 108 as a part of a computer operating system 104. Computer operating systems 104 typically include a portion of their operating system that may facilitate networking 105. Of the networking functions 105 available, a single sign on ("SSO") 106 capability may be provided in the examples described below. Particularly a single sign on ("web SSO") 107 that allows the elimination of shadow accounts, and a sign on that allows access to federated resources that allow the elimination of shadow accounts 108 will be described. The first example of Web SSO 107, may operate independently of the second example of federated resource sign on 108.

Tokens to Access Extranet Resources

Web single sign on typically does not exist on a computer operating in isolation. Web SSO may be provided on a plurality of processor based, or computing devices 101, 102, 103 working in cooperation to form one or more networks. Computing devices that make up a network typically include servers 103, PCs 102, laptop computers 101 and the like. Any number of these computing devices may be provided with web SSO capabilities so that they may operate in conjunction with one or more client computers seeking to access a network providing SSO capabilities while maintaining security and smooth operation of the network's functions. The methods that allow access to federated resources may also be located in the operating system 104. The federation access methods do not necessarily have to reside in the same location as the SSO capabilities, and either may exist independently of the other.

Figure 2:
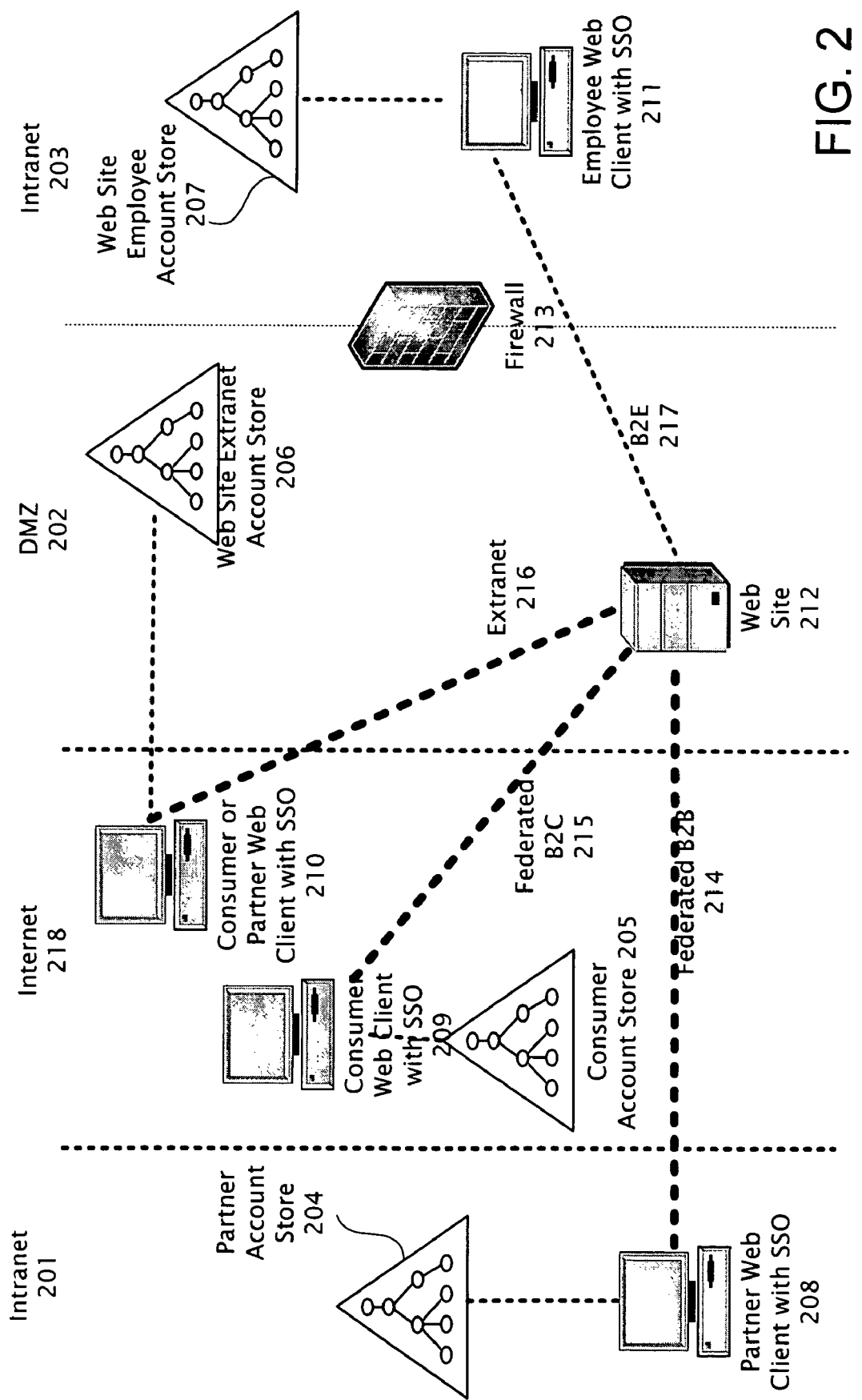
FIG. 2 shows various network examples implementing web SSO.

FIG. 2 shows various network examples implementing web SSO. In implementing web SSO there are typically three network components (or players) that may be of particular interest in SSO implementation. By deploying these components in varying configurations various web SSO configurations may be possible.

First there may be a Web clients (Users) 208-211 which may be the program a user runs to access a web site. Examples include conventional applications or browsers capable of accessing the internet.

The second component is the Web Site (Resource Owner) 212 which is typically a service containing resources the user accesses. Examples may include various applications, web pages, or web sites that a user may access. In a SSO situation an organization such as a corporation may wish to deploy the web site 212 in the DMZ so that a client on the internet 210 may access the application. In the present example the corporation may be able to move the application from the intranet 203 to the DMZ 202, without reworking the application to change the authorizations. However, moving an application to the DMZ has in the past involved providing a shadow account to establish trust through conventional authorization standards or access control lists.

Finally there is the Account Store (Account Administrator) 204-207 component which is typically a service that defines identities and attributes for controlling user access to web site resources. Examples may include LDAP-based directories, SQL-based databases, and the like. The resources may reside on the intranet 201, the DMZ 202 or the internet 218.

A system implementing web SSO provides flexibility when deploying the three previously mentioned components to enable different WebSSO scenarios. Various configurations of these three components allow B2E 217, Federated B2B 214, Federated B2C 215, and Extranet 216 configurations. The first example of using tokens to access extranet resources is shown in the extranet configuration 216. The second example of using tokens to access federated resources is shown in the federated B2C 215 configuration and the federated B2B 214 configuration. The first and second examples will be described more fully below.

Business to Enterprise ("B2E") 217 typically allows employees from the site's own business 211 to access the web site 212, using their employee identities from the business's account store 207. Employees can access the site from their intranet or out on the web without requiring a vpn. Federated business to business ("Federated B2B") 214 typically allows employees from a partner business 208 to access the web site 212 using identities from their (partner business's) account store 204. Federated business to consumer ("Federated B2C") 215 typically allows consumers on the internet 209 access the web site 212 using identities from an external consumer account store (such as Passport) 205. B2B typically refers to e-commerce between different companies that have some sort of partnering arrangement, in contrast to B2C, or business-to-consumer, relationships in which individuals or companies purchase the products or services of another company. Extranets 216 typically allow consumers or ad hoc partners 210 to access the web site 212 using accounts issued to them by the web site's business itself, and managed in an extranet account store 206 local to the site.

In each of these scenarios 214-217, the web site 212 effectively trusts a different account store 204-207. The web site 212 trusts local account stores 206, 207 directly, and will trust partner or consumer account stores 204, 205 indirectly, via federation. Federated trusts typically require a business level agreement between two account store owners. Thus, one web site can mix and match configurations as shown.

Security is maintained in Web SSO configurations. Web-SSO typically provides the authentication and authorization infrastructure utilized by account stores and web sites to implement the different trust scenarios presented by each configuration in a safe way. In a B2E example 217, an employee 211 could access internal and DMZ corporate web sites, as well as outsourced benefits sites, with a single sign-on using her corporate Active Directory identity 207. In a B2B example 214, WebSSO could enable a first organization to federate a SharePoint site 206 in its DMZ 202 with the employees of a second organization 208, using identities defined and managed by the second organization within their own Active Directory 204.

Definitions of the terminology used above are provided in the paragraphs that follow to aid the user in understanding the examples provided. However these definitions are not meant to limit the practice of the examples to the structures disclosed. It will be appreciated that the examples provided may be applied to a variety of network configurations, and are not limited to any one manufacturer's design, standard or particular implementation.

A federation typically refers to the association of different organizations (e.g., different autonomous identity domains or realms) that have employed agreements, standards, and/or cooperative technologies to make user identity and entitlements portable between the organizations. In this manner, a user of one realm can access a Web application of a different realm without multiple logon events.

A forest may be used to link more closely related organizations. Domains are often used to represent organizations and their members. A tree is typically a collection of domains, or child domains. To manage closely related business entities, such as within a corporation, each respective tree ("tree") can be interconnected within a domain forest ("forest"). Trees in a forest are typically connected by two way trust relationships. When trees are grouped together and implemented as a network system in a forest, the forest boundary becomes the trust (e.g., security) boundary and the unit of administrative isolation for the group of domains.

A demilitarized zone ("DMZ") may refer to a perimeter security network typically established at a boundary between a local area network ("LAN") and the internet. Such a DMZ serves to protect servers on the LAN from malicious users on the internet. Typically a firewall stands between the LAN and DMZ. A DMZ may include proxy servers, web servers, and virtual private network ("VPN") servers. Proxy servers typically provide secure access for external users accessing information on the LAN, and typically appear transparent to client computers. Proxy servers may be programmed to disallow access to specific resources. Web servers are typically accessible to anyone on the internet. VPN servers are typically remote access and authentication servers that allow secure access to the LAN through the internet. Secure access to network may be provided by various security protocols such as a conventional Kerberos system. Security protocols are protocols that allow networks and systems to authenticate users, computers, and applications for purposes of accessing resources on these networks and systems. Security protocols use various forms of encryption to ensure the privacy, authenticity, and integrity of a user's credentials and of network communications.

Figure 3:
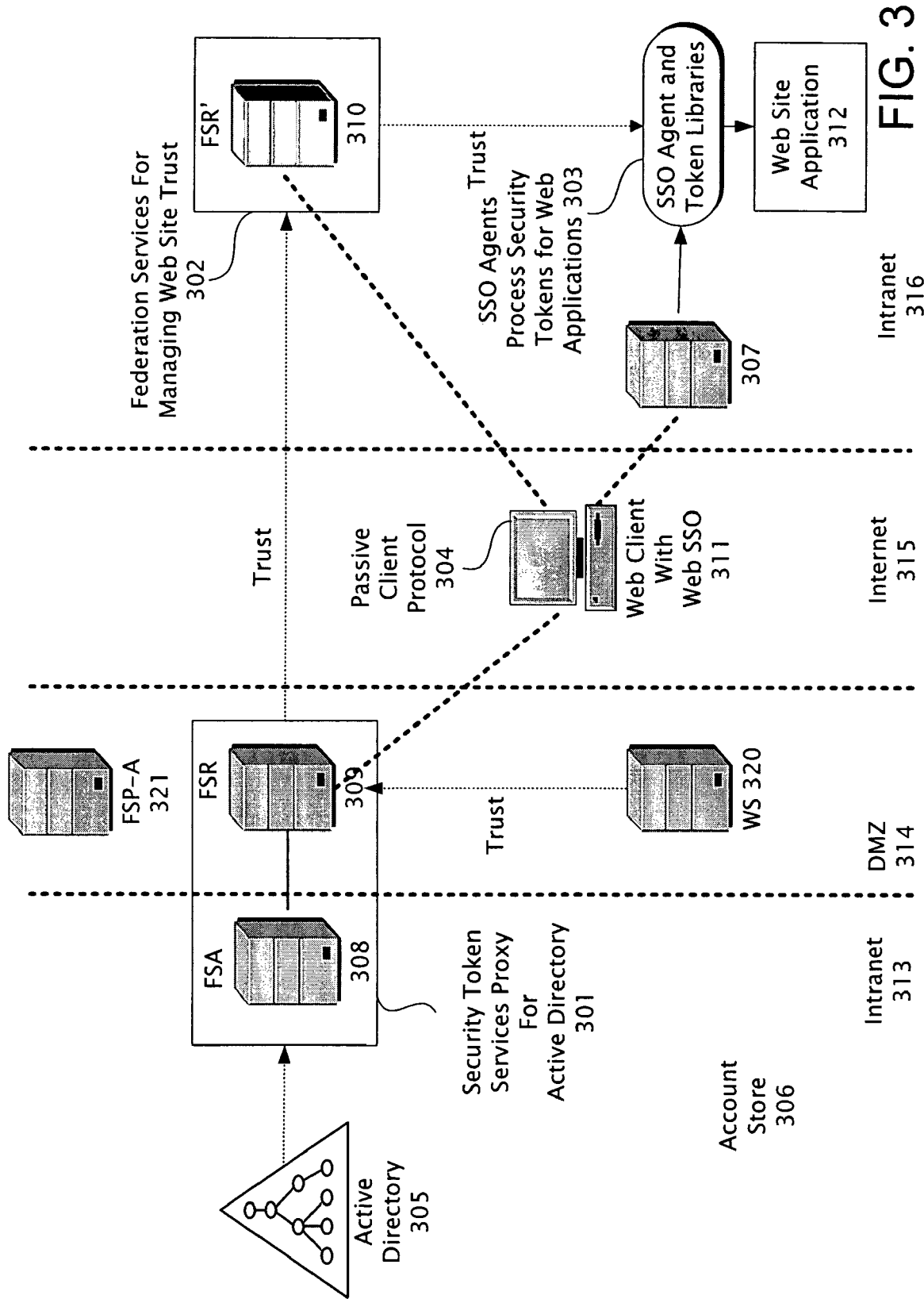
FIG. 3 is a block diagram showing system components used to maintain security during Web SSO.

FIG. 3 is a block diagram showing system components typically used to maintain security during Web SSO that uses tokens to access extranet resources and allows shadow directories to be omitted. Web SSO may maintain security by providing the following components.

First, Security Token Service Proxies for the Active Directory 301 are provided. These services produce web-appropriate security tokens for identities and attributes contained in Active Directory 305. The Active Directory 305 stays in the intranet 313, protected by proxied services 309 in the DMZ 314. A web server ("WS") 320 is deployed in the DMZ to make applications available to a client or web client, 311. Deploying the WS in the DMZ typically calls for deploying the FSR 309 in the DMZ so that trust is established between the WS and FSR without causing security issues by crossing the DMZ, Intranet boundary. FSP-A 321 is the proxy server of FS A 308.

Second, Federation Services for Managing Web Site Trust 302 gives resource owners the mechanism to define and control trust with the various account store owners. Federation Services are described in U.S. Pat. No. 09/886,146, filed Jun. 20, 2001 and U.S. Pat. No. 10/029,426, filed Dec. 21, 2001, the contents of which are incorporated by reference.

Third, SSO Agents Process Security Tokens for Web Applications 303—These agents (ISAPI extension and token/aims libraries) may convert security tokens into a Windows™ NT (Microsoft Corporation Trademark) Impersonation context or ASP.Net roles utilized by IIS applications for access control. In alternative embodiments equivalent agents that process security tokens may be substituted. Security claims are described in further detail in U.S. Patent application Ser. No. 11/119,236 filed Apr. 29, 2005 the contents of which are incorporated herein by reference.

Fourth, an Interoperable Web Services Protocol, or passive client protocol 304 is provided. Account stores and web sites typically do not communicate directly; security tokens are conveyed between them by clients using protocols such as the Web Services-Federation passive client protocol. This type of protocol exchanges Web Services-Security XML security tokens, including SAML and XrML tokens. Alternatively other equivalent protocols and token exchanges may be utilized. An exemplary interoperable web services protocol is described in U.S. Pat. No.10/436,880, filed May 12, 2003, the contents of which are incorporated by reference.

Fifth a Web Server, including a plurality of applications is provided. The web server typically trusts the server FSR, 309.

Web Single Sign On ("SSO") may give a user the ability to access computer resources with a single identity, and a single logon per session, even when accessing multiple applications. Web single sign on ("WebSSO") is typically regarded as a subset of single sign on that applies only to browsable web sites. However due to the popularity of the internet web single sign on tends to be more prevalent than SSO.

A network may provide a DMZ zone outside of its firewall. Resources may be deployed in this DMZ zone. In accordance with an illustrative embodiment, corporate users access DMZ resources using traditional Windows™ authentication & authorization using single sign on without shadow accounts. In this scenario, a company has a DMZ zone where the company deploys resources (for example, SharePoint servers) accessible to corporate users.

Figure 4:
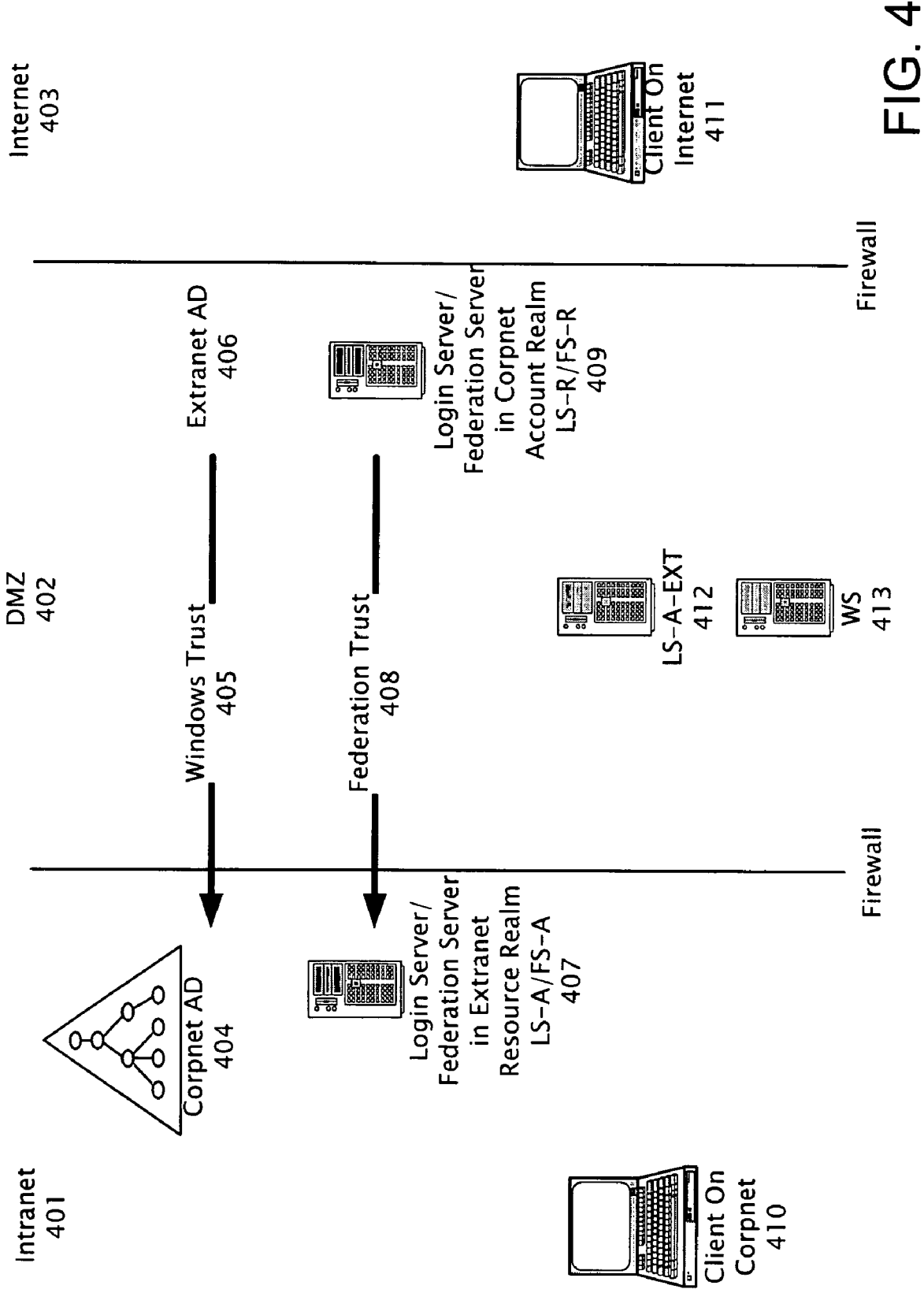
FIG. 4 is a block diagram showing overall processing flow for extranet access.

FIG. 4 is a block diagram showing overall processing flow for extranet access. The extranet DMZ active directory ("AD") 404 has a one way Windows™ trust to the corpnet active directory 402. A LogonSever/FederationServer ("LS-R/FS-R") 403 is deployed in the Extranet Resource realm and a LogonSever/FederationServer ("LS-A/FS-A") 404 is deployed in the Corpnet Account realm or intranet 401. Federation trust between the Extranet Resource realm and the Corpnet Account realm is flagged on both sides as the "WindowsRealmTrust"trust which means that the Extranet realm has applications using traditional Windows™ authentication and authorization for users from the Corpnet realm AD store. The trusting application running on the web server ("WS") is flagged as "WindowsRealmTrust"on federation server ("FS-R") which means that the application is accepting user SIDs for the purposes of building the local NT access token.

The client accesses a traditional web application running on the web server, WS, deployed in the DMZ. The client may be located on the Internet or on the intranet. The end goal is to build an NT access token on WS so that normal NT authorization can be used against access control lists ("As") on the accessed resources. This means that the user authorization attributes (SIDs) will be delivered to WS in some form.

Figure 5:
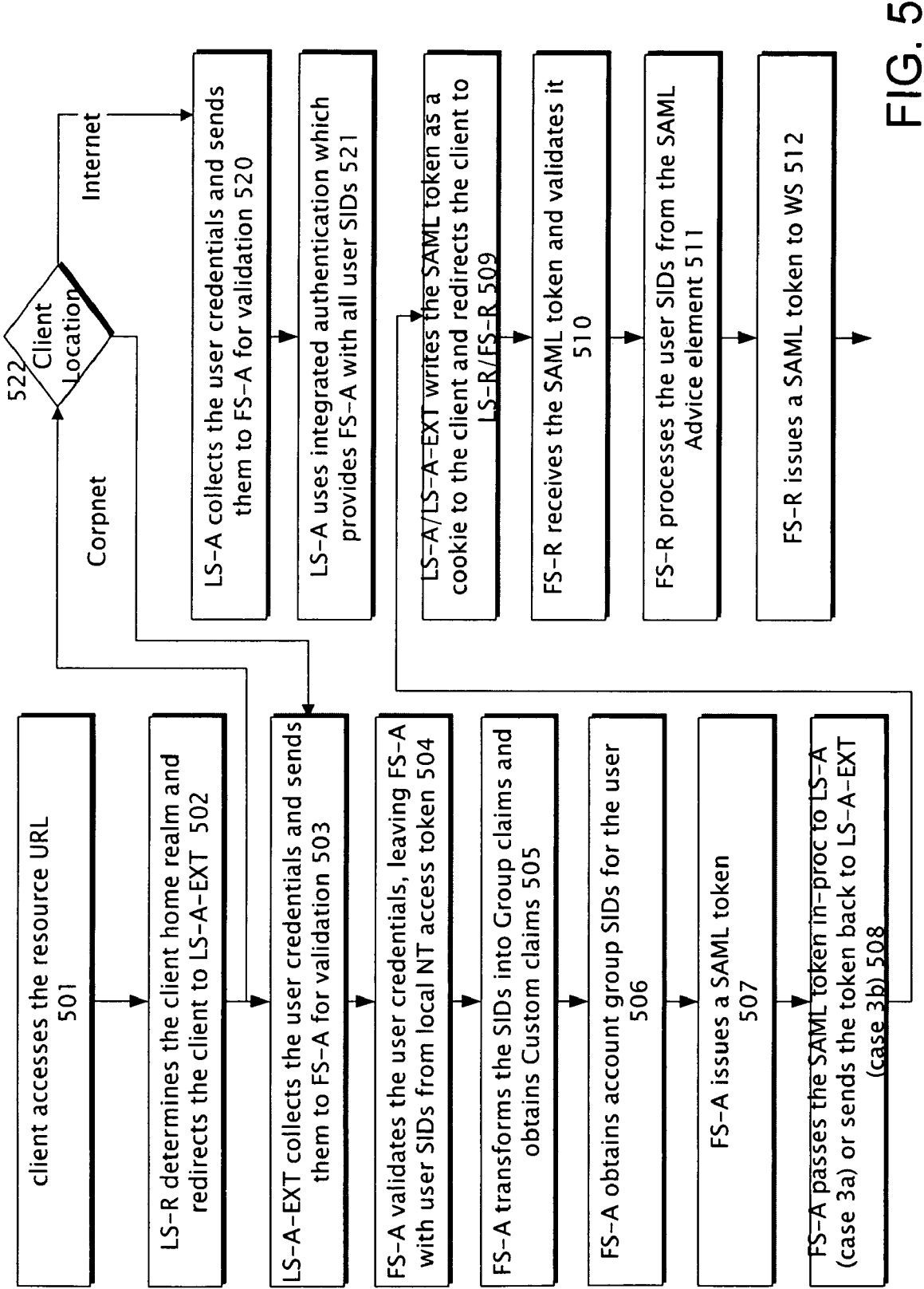
FIG. 5 and FIG. 6 are flow diagrams showing a method of utilizing tokens to access extranet resources.
Figure 6:
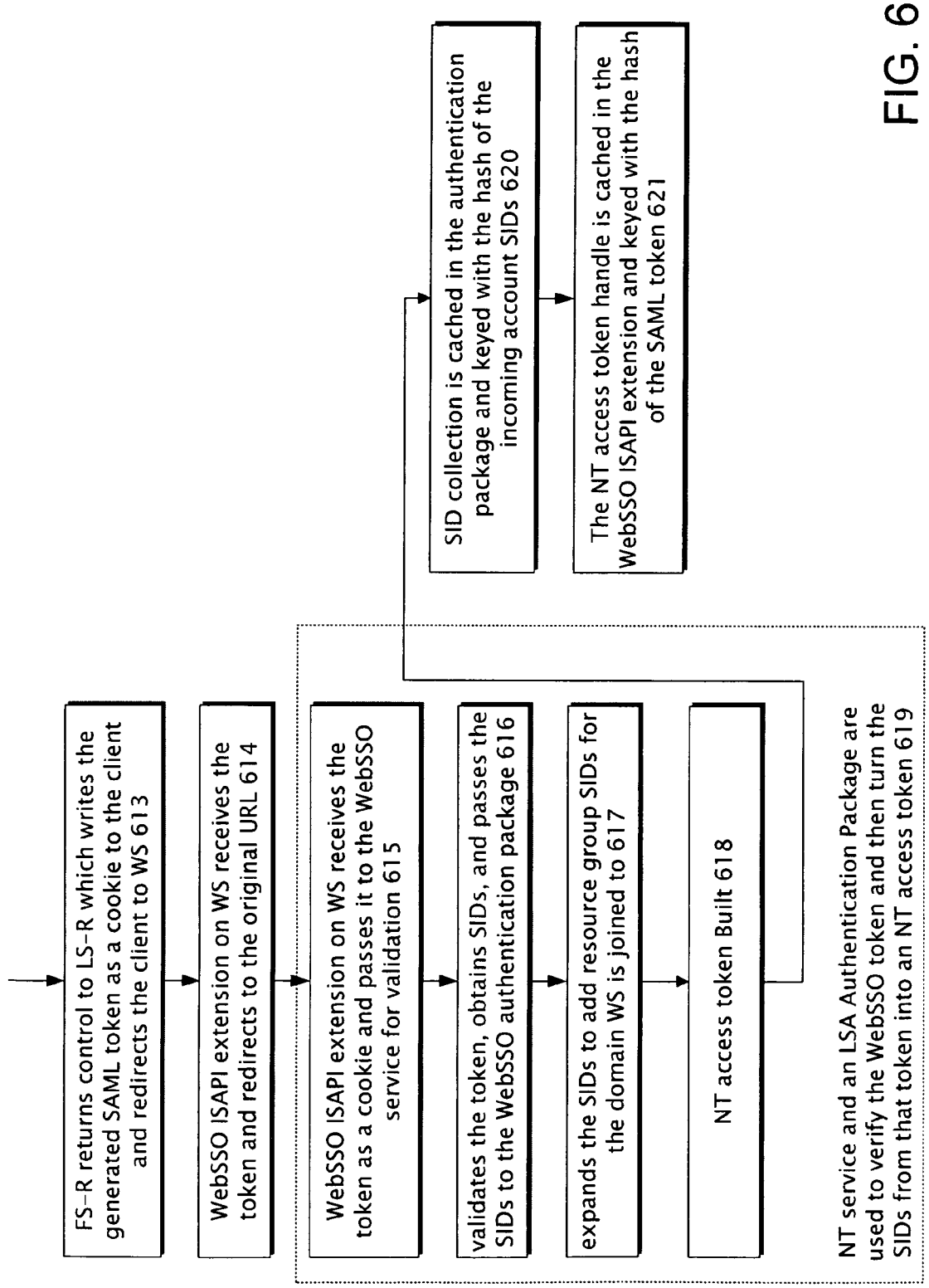

FIG. 5 and FIG. 6 are flow diagrams showing a method of utilizing tokens to access extranet resources by a client on the internet. The flow of token exchanges for establishing Windows™trust is maintained as is typical for a Windows™ network, or its equivalent. However, the construction and content of the tokens are varied by providing security identifiers ("SIDs") in the token instead of in a shadow account. For authentication the SIDs are already present and there is no need for an application to retrieve them from a shadow account in the application's domain.

First the client on the internet accesses (via HTTP GET) the resource URL from the web client having the desired application, that is located in the DMZ 501. The client has no authentication cookie, so the client is redirected to LS-R/FS-R. Second, the LS-R determines the client home realm and redirects the client to LS-A-EXT 502.

If the client is located on the corpnet, the client sends the request to LS-A rather than LS-A-EXT. There are a few options for this implementation. For example, a special DNS configuration can be used on the corpnet DNS servers so that the LS-A-EXT name gets resolved to the IP address of LS-A. Another possibility executed in an alternative embodiment is to have two NICs on LS-A-EXT (one NIC facing the corpnet and the other one facing the Internet) and determine the client locality based on which NIC is used to connect to LS-A-EXT. In this case, LS-A uses integrated authentication which provides FS-A with all user SIDs.

or, if the client is located on the Internet, LS-A-EXT collects the user credentials (username&password or the client certificate) and sends them to FS-A for credential validation or verification 503. FS-A validates the user credentials. After credentials are validated, FS-A has a collection of user SIDs from the local NT access token 504.

With the user SIDs obtained in the previous step, FS-A transforms the SIDs into Group claims and obtains Custom claims using LDAP attributes from the user AD account 505. Then, given that the resource realm is WindowsRealmTrust, FS-A obtains account group SIDs for the user 506. Then FS-A issues a SAML token carrying the transformed WebSSO claims as attributes and account group SIDs within the Advice element 507. For further details see the section "SID Packing"for the format of the Advice element. FS-A passes the SAML token in-proc to LS-A (case 3a) or sends the token back to LS-A-EXT (case 3b) 508. LS-A/LS-A-EXT writes the SAML token as a cookie to the client and redirects the client to LS-R/FS-R 509.

FS-R receives the SAML token and validates it 510. Upon successful token validation, FS-R performs normal claim transformation for the claims obtained from the token. Then, given that the account realm is the WindowsRealmTrust realm, FS-R processes the user SIDs from the SAML Advice element 511. Specifically, FS-R filters the received SIDs (as described in the section "SID Filtering" below). FS-R issues a SAML token to WS carrying transformed claims appropriate to WS as attributes and filtered account group SIDs within the Advice element 512. Continuing the flow diagram in FIG. 6, FS-R returns control to LS-R which writes the generated SAML token as a cookie to the client and redirects the client to WS 613.

The WebSSO ISAPI extension on WS receives the token and redirects to the original URL 614 that the client was trying to access. In this redirect the ISAPI extension writes the WebSSO token as a cookie.

The WebSSO ISAPI extension on WS receives the token as a cookie and passes it to the WebSSO service for validation 615. The service validates the token, obtains SIDs, and passes the SIDs to the WebSSO authentication package 616. The package expands the SIDs to add resource group SIDs for the domain WS is joined to 617 (see the section "Group Expansion" below). The resulting collection of SIDs is used to build an NT access token 618. Blocks 615-618 show that for security reasons a NT service and an LSA Authentication Package are used to verify the WebSSO token and then turn the SIDs from that token into an NT access token 619. The SID collection is cached in the authentication package and keyed with the hash of the incoming account SIDs 620 for future use. The NT access token handle is cached in the WebSSO ISAPI extension and keyed with the hash of the SAML token for future use 621.

Cookies written to the client are used to achieving single sign-on experience and to avoiding repetitive and typically expensive operations. The cookie written in 508 (of FIG. 5) will be used when the client is redirected from the resource realm to the account realm, so that the user credentials verification and claim/SID extraction can be avoided. The cookie written in 510 (of FIG. 5) will be used when the client is redirected by a resource application server to the resource realm FS-R, so that claim transformation and SID filtering can be avoided. The cookie written in 614 will be used as the client communicates with WS as follows.

The WebSSO ISAPI extension will search the cached NT token in its cache (by hashing the SAML token sent in the cookie and finding corresponding cache entry with that hash), so the user will immediately be impersonated. If no cached NT token is found, the WebSSO ISAPI extension will pass SIDs from the cookie to the WebSSO authentication package that will search its cache to find an entry with the key equal to the hash of the incoming SIDs, so that the resource group SID expansion can be avoided. If the WebSSO authentication package does not find the SIDs in its cache then it will build a NT access token as specified in 615-621 above.

An alternative example of the resource group expansion process would be to expand groups on FS-R instead of WS. This way, FS-R would write a cookie to the client with all the SIDs and use the SIDs next time the client accesses some other resource provided the other resource is joined to the same domain as WS. However, this would call for knowledge on FS-R of the domains for all deployed application servers. One way to achieve this is to include the domain name as part of wctx parameter prepared on the application and sent to FS-R. This parameter is not be authenticated, so WS could put a domain name other than the one WS is joined to.

A further alternative example is to configure the domain of WS in the trust policy at the time the trusting application is added, but this approach would typically call for more administration Credentials Verification The following description expands upon the credential verification process described above at step 503 (of FIG. 5). In this process, FS-A verifies two types of user credentials: Username and password, and the client cert. The username and password are verified via the published LogonUser API. The result is an NT access token that typically contains all user SIDs (account SIDs and resource SIDs for the domain FS-A is joined to). The username maybe in the UPN format (user@somewhere.com) or in the SAM account name format (somewhere\user). The client cert will typically be verified by passing it to the WebSSO authentication package via a Lsa-CallAuthenticationPackage call with the protocol submit buffer containing the cert in the following data structure:

```
typedef enum _WEBSSO_PROTOCOL_MESSAGE_TYPE {
    WebSsoMapClientCert = 0
} WEBSSO_PROTOCOL_MESSAGE_TYPE,
*PWEBSSO_PROTOCOL_MESSAGE_TYPE;
typedef struct _WEBSSO_CERT_MAP_REQUEST
{
    WEBSSO_PROTOCOL_MESSAGE_TYPE MessageType;
    DWORD CertLen;
    BYTE *Cert;
} WEBSSO_CERT_MAP_REQUEST,
*PWEBSSO_CERT_MAP_REQUEST;
```

The call will typically be allowed from an untrusted caller so that FS-A doesn't have to hold the TCB privilege. However, since the package is returning the user security attributes, the package may allow the call only if the caller is FS. To this end, the FS setup will typically create a local machine group ADFSGroup and put the FS account into that group. The auth package will verify that the caller has the ADFSGroup SID in its NT access token.

The WebSSO package will in turn pass the cert to the Windows TLS/SSL Security Service Provider™ for verification via the internal LsaICallPackage call. Upon successful verification, the WebSSO package will return the user UPN, the user account domain name, and the user token groups (SIDs) in the following data struct:

```
typedef struct _WEBSSO_CERT_MAP_RESPONSE
{
    UNICODE_STRING Upn;
    UNICODE_STRING AccountDomain;
    TOKEN_USER TokenUser;
    TOKEN_GROUPS TokenGroups;
} WEBSSO_CERT_MAP_RESPONSE,
*PWEBSSO_CERT_MAP_RESPONSE;
```

Group Expansion

The following description expands upon the credential verification process described above at step 617. FS-A performs the account and resource group expansions by using new AuthZ functionality implemented for that purpose, AuthziWebSsoGetGroupsBySid. AuthZ currently does group expansion, but the expansion is not selective, i.e. both account and resource groups were always expanded. AuthZ has been modified so that the expansions are separated so that the account side (FS-A) can expand the account groups and the resource side (WS) can expand the resource groups in their respective domains. In addition, performance optimizations are implemented to cache LDAP and SAM handles used by AuthZ.

SID Packing

To reduce the size of the SAML token, SIDs are packed in the SAML Advice element as follows. The Advice element is:

```
<saml:Advice>
<WindowsIdentifiers
xmlns="http://fabrikam.com/federation/v1/
WindowsIdentifiers">AQQAAAAAA ... AA=</WindowsIdentifiers>
</saml:Advice>
```

(Note that "http://fabrikam.com/federation/v1/WindowsIdentifiers" is a temporary namespace.) The WindowsIdentifiers element contains base64 encoded string containing the user SIDs in the following format:

Flags | DomainSidCount | AccountDomainSid | RidCount | Rid_1 | ... | Rid_N | DomainSid | RidCount | Rid_1 | ... | Rid_M | ...

Here the vertical separator | indicates the DWORD boundary. The first DWORD is the Flags parameter. If bit 1 is set in the Flags parameter received by WS, it will indicate that WS needs to expand the groups to add the resource groups. The second DWORD is the parameter that indicates how many domain SIDs are present in the buffer. The next DWORD is the first domain SID which is the account domain SID. The next DWORD is the number of RIDs for the account domain SID. Note that account and group SIDs are constructed by combining the domain SID with the corresponding RIDs. The next DWORD is the RID of the user account. It is followed by the group RIDs (of which there will be one less than the number defined in the RidCount). Then there comes the next domain SID followed by the RID count for that domain followed by the RIDs. The pattern repeats itself until all domain SIDs with their RIDs are enumerated.

SID Filtering

WebSSO performs SID filtering on FS-R that follows the same rules as the native SID filtering typically performed on resource domain controllers. Filtering is achieved using the typical Windows™ implementation and implementing the internal DC specific Windows Local Security Authority ("LSA") (not to be confused with LS-A) routines. Those routines compute the domain and forest trust topologies and perform SID searches at runtime. To implement them domain trusts and the forest trusts from the root domain DC are obtained by using DsEnumerateDomainTrusts and DsGetForestTrustInformationW APIs. These APIs return information needed to determine the trust boundaries and identify the trust types and trust attributes of the extranet trust. Given that information, any given SID may be matched against the domain SIDs in the local forest, as well as trusted domains (trusted either directly or transitively for cross forest trusts). That information is updated periodically to account for domain trust changes. This allows implementation of the internal LSA APIs used so that the same core code base may be used. The final section of this document will deal with the federated partner access to these resources.

Tokens to Access Federated Resources

FIG. 7 is a block diagram of overall processing flow for federated partner to extranet resources. The extranet DMZ Active Directory includes shadow accounts in the Active Directory that Web SSO tokens may be mapped to, so that a NT access token may be generated. The protocol to get the Web SSO token is similar to the protocol described above and the WS-Federation protocol. Once the FS-R has the Web SSO token for the client issued by the account FS then the FS-R may map the claims in that token.

FIG. 8 is a flow diagram showing three different ways to map claims to allow the generation of a NT access token.

First the User Principal Name ("UPN") claim is in the FS-A issued token 801 and this claim is passed through by the FS-R unchanged to the WS 802. In this case it is assumed that there is a shadow account in the DMZ AD that has UPN that matches the federated client's UPN claim.

Second the e-mail claim is in the FS-A issued token 803 and the claim is changed to a UPN claim 804. The claim is passed through by the FS-R to the WS 805. In this case it is assumed that there is a shadow account in the DMZ AD that has a UPN that matches the federated client's email address.

and third a group claim is in the FS-A issued token 806, and is mapped to a UPN claim 807. In this case it is assumed that there is a shadow account in the DMZ AD that has a UPN that matches the mapping UPN. Note that multiple client's are mapped to one shadow account in this case.

Currently the only place where shadow accounts are required is on the resource side of a federated relationship that deploys traditional (NT access token based) applications. Shadow accounts are typically required so that the ADFS web agent can impersonate the shadow account for the purposes of building the NT access token. Shadow accounts, are typically a major customer concern due to the need to deploy the accounts and maintain them. In many cases, shadow accounts constitute deployment blockers as is currently the case for deploying ADFS in the DMZ).

This second example may remove shadow accounts by transforming inbound group claims received from a non-DMZ account realm into local resource AD groups and use the AD group SIDs to build the NT token. The resources will be ACL'ed with local AD group SIDs, therefore the resulting NT token will be appropriate for access checks performed by the resource application.

To implement this second example, that may eliminate shadow directories, a new corporate group claim type, ActiveDirectoryGroupaim is utilized. aims are typically statements that an authority may make about principals, such as name, identity, key, group, privilege, capability and the like. claims may be asserted by security tokens.

This claim type extends the GroupClaim by adding a SID property which is the SID of the corresponding AD group. ActiveDirectoryGroupaim is a GroupClaim and it will, therefore, be treated as such in typically all places that currently manipulate corporate group claims like claim transformations.

At runtime, after the resource FS-R gets an inbound token from a non-DMZ realm and transforms inbound group claims into outbound corporate group claims (which may include AD groups) issued to the application, FS-R will typically add the AD group SID for each ActiveDirectoryGroupaim found in the outbound collection.

In addition to the group SIDs, the FS will typically generate the user SID derived from the trusted realm URI and the value of the identity claim in the inbound token (see below for the details of the user SID generation algorithm).

The resulting user SID and the group SIDs will be passed to the web server agent in the Advice element of the new token issued, which is typically the same way as it's done conventionally by the DMZ resource FS-R.

The web server (WS) will get the SIDs, will expand them to add resource domain local group SIDs, and will build the token with these SIDs via a conventional authentication package. To build the NT token, in addition to SIDs the auth package may need to have the AuthenticatingAuthority and the AccountName properties that are set as the originating account authority and the user name in the resulting logon session, respectively. The account realm URI and the identity claim value may be used for this purpose, respectively.

Note that as a result, the account realm URI and the user identity will be logged in the security audit event generated by the LSA upon successful logon performed by the authorization package. This tends to be a useful feature as it provides auditing capabilities for the actual user account instead of a shadow account.

An example of such audit is shown below; the audit was generated upon a successful logon of user user@adatum.com by our auth package modified as described above:

| | |
|---|---|
| Event Type: | Success Audit |
| Event Source: | Security |
| Event Category: | Logon/Logoff |
| Event ID: | 540 |
| Date: | Oct. 6, 2004 |
| Time: | 6:58:15 PM |
| User: | urn:federation:adatum\user@adatum.com |
| Computer: | KAHRENT2-FS |
| Description: | |
| Successful Network Logon: | |
| User Name: | user@adatum.com |
| Domain: | urn:federation:adatum |
| Logon ID: | (0x0, 0x44828) |
| Logon Type: | 3 |
| Logon Process: | |
| Authentication Package: | IfsAp |
| Workstation Name: | — |
| Logon GUID: | — |
| Caller User Name: | KAHRENT2-FS$ |
| Caller Domain: | REDMOND |
| Caller Logon ID: | (0x0, 0x3E7) |
| Caller Process ID: | 2736 |
| Transited Services: | — |
| Source Network Address: | — |
| Source Port: | — |

For more information, see Help and Support Center at http://go.microsoft.com/fwlink/events.asp.

In a further alternative examples a customer may deploy shadow accounts for some users and use the SAML-group-to-AD-group transformation (SG2ADG) for other users. In principle, for a given set of UPN/Email and SIDs, one may first attempt to do a shadow account logon and, if the shadow account logon fails with error indicating that the user doesn't exist, do the logon with SIDs. However, doing this typically impacts perf significantly in cases when shadow accounts are not deployed for many users.

To determine whether to use shadow accounts or SIDs, a new trust policy OM enumeration type, ShadowAccountExistence, for trusted realms is added. The enum will typically have four values: Unspecified, ShadowAccountsAbsent, ShadowAccountsForSomeUsers, ShadowAccountsForAllUsers. Unspecified means that the shadow account existence has not been specified for users from this realm. This is the default value. ShadowAccountsAbsent means that there are no shadow accounts deployed for users coming from this trusted realm. In that case, SIDs resulting from the SG2ADG transforms will be used to build the NT token. ShadowAccountsForSomeUsers typically means that shadow accounts are deployed for some users from this trusted realm. In this case, logon with shadow accounts UPN/Email will be attempted first and then logon with SIDs will be attempted next for users from this trusted realm. ShadowAccountsForAllUsers typically means that shadow accounts are deployed for all users from this trusted realm. Only logon with shadow account UPN/Email will be attempted in this case.

At the runtime, when FS-R issues a SAML token to a traditional application, FS-R will indicate in the issued SAML token the type of the logon the application should perform. FS-R will determine the type of logon based on the value of ShadowAccountExistence as follows:

Unspecified: if the resulting claim collection contains ActiveDirectoryGroupaim claims, FS-R will indicate that only logon with SIDs should be attempted. Otherwise, if the user identity is UPN/Email, FS-R will indicate that only shadow account logon should be attempted. Otherwise, FS-R will fail the user request because the traditional WS will not be able to build the NT token.

ShadowAccountsAbsent: if the resulting claim collection contains ActiveDirectoryGroupaim claims, FS-R will indicate that logon with SIDs should be attempted. Otherwise, FS-R will fail the user request because the traditional WS will not be able to build the NT token.

ShadowAccountsForSomeUsers: if the user identity is UPN/Email, FS-R will indicate that the shadow account logon should be attempted first, and then the SIDs logon should be attempted next if SIDs are present in the SAML token issued to the application. Otherwise, if the resulting claim collection contains ActiveDirectoryGroupaim claims, FS-R will indicate that logon with SIDs should be attempted. Otherwise, FS-R will fail the user request because the traditional WS will not be able to build the NT token.

ShadowAccountsForAllUsers: if the user identity is UPN/Email, FS-R will indicate that the shadow account logon should be attempted for the user; FS-R will not include SIDs in the SAML token. Otherwise, FS-R will fail the user request even if the resulting claim collection contains ActiveDirectoryGroupaim claims. Indeed, ActiveDirectoryGroupaim claims may appear in the collection in the sense of normal GroupClaim and it's not admin's intention to treat them as AD groups per the value of ShadowAccountsForAllUsers.

The presence of the packed SIDs structure in the SAML token issued to WS will indicate that WS should attempt the SIDs logon. The structure will also indicate whether shadow account logon should be attempted prior to the SIDs logon. Specifically, if bit 2 is set in the Flags parameter of the structure, WS will first attempt shadow account logon using UPN/Email identity claim from the SAML token. Otherwise, WS will do SIDs logon only. If the SID structure is absent, WS will do the shadow account logon only.

The UI will typically support setting the value of the ShadowAccountExistence enumeration type for trusted non-DMZ realms. The UI will also support the new ActiveDirectoryGroupaim claim type in the organization aims. The only difference between the new claim type and the existing group claim type is the addition of the Sid attribute which will be populated via the same Object Picker code that is already implemented in the UI for the group claim population by the AD store.

User SID Generation

The FS will generate the user SID as follows. The SID will be unique for a given user from a given trusted realm. The SID will typically be 28 bytes long (which is the size of a normal AD SID). The SID_IDENTIFIER_AUTHORITY of the SID will typically be set to a new ADFS authority to distinguish the SID from any other existing SIDS. The 20 bytes allocated to SID sub-authorities will be filled with the hash of the string "<trusted realm URI>\<identity claim value>" where <trusted realm URI> is the URI of the account realm that issued the SAML token and <identity aim value> is the value of the identity claim (UPN, Email, or CommonName) from the SAML token. The 20 byte hash will typically be large enough to generate unique SID for a given user from a given realm. So, to summarize, the generated SID will typically look like "S-1-<ADFS authority>-<5 DWORD sub-authorities filled with the 20 byte hash>".

Note that the WebSSO token issued to the federated client will not have SIDs in the Advice element. The WS then receives the WebSSO token, as a cookie, issued by the FS-R with a UPN claim. The WebSSO token is verified by the NT service and the UPN is passed to an LSA authentication package. If the WS is in a Windows™2003 (Microsoft Trademark™ domain where Kerberos S4U is supported then the service will call the Kerberos authentication package with LsaLogonUser and an NT token will be returned. If the WS is in a Windows 2000™ domain then the WebSSO Authentication package is called, using LsaLogonUser, and the UPN is passed in to the package and a token is returned. The WebSSO Authentication package uses the AuthZ APIs to get the SIDs for the passed in UPN and then builds a token based on these SIDs.

The structures used when calling LsaLogonUser are

```
typedef enum _WEBSSO_LOGON_SUBMIT_TYPE
{
WebSsoLogon = 2,
WebSsoSidsLogon,
WebSsoCertLogon
} WEBSSO_LOGON_SUBMIT_TYPE,
*PWEBSSO_LOGON_SUBMIT_TYPE;
typedef struct _WEBSSO_LOGON
{
WEBSSO_LOGON_SUBMIT_TYPE MessageType;
UNICODE_STRING ClientUpn;
} WEBSSO_LOGON, *PWEBSSO_LOGON;
typedef struct _WEBSSO_SIDS_LOGON
{
WEBSSO_LOGON WebSsoLogon;
TOKEN_USER TokenUser;
PTOKEN_GROUPS TokenGroups;
} WEBSSO_SIDS_LOGON, *PWEBSSO_SIDS_LOGON;
```

The client application, in this case the service, calls LsaLookupAuthenticationPackage with the package name ("WebSsoAp") and then calls LsaLogonUser and provides a filled-in _WEBSSO_LOGON structure in the AuthinfoBuffer parameter.

The authentication package maintains an AVL-tree based cache of the token information retrieved from AzMan, index on the client UPN.

Computing Environment

FIG. 9 illustrates an exemplary computing environment 900 in which the web SSO described in this application, may be implemented. Exemplary computing environment 900 is only one example of a computing system and is not intended to limit the examples described in this application to this particular computing environment.

For example the computing environment 900 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

The computer 900 includes a general-purpose computing system in the form of a computing device 901. The components of computing device 901 can include one or more processors (including CPUs, GPUs, microprocessors and the like) 907, a system memory 909, and a system bus 908 that couples the various system components. Processor 907 processes various computer executable instructions, including those to control the operation of computing device 901 and to communicate with other electronic and computing devices (not shown). The system bus 908 represents any number of several types of bus structures, including a memory bus or memory controller, a peripheral bus, an accelerated graphics port, and a processor or local bus using any of a variety of bus architectures.

The system memory 909 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 907.

Mass storage devices 904 may be coupled to the computing device 901 or incorporated into the computing device by coupling to the buss. Such mass storage devices 904 may include a magnetic disk drive which reads from and writes to a removable, non volatile magnetic disk (e.g., a "floppy disk") 905, or an optical disk drive that reads from and/or writes to a removable, non-volatile optical disk such as a CD ROM or the like 906. Computer readable media 905, 906 typically embody computer readable instructions, data structures, program modules and the like supplied on floppy disks, CDs, portable memory sticks and the like.

Any number of program modules can be stored on the hard disk 910, Mass storage device 904, ROM and/or RAM , including by way of example, an operating system, one or more application programs, other program modules, and program data. Each of such operating system, application programs, other program modules and program data (or some combination thereof) may include an embodiment of the systems and methods described herein.

A display device 902 can be connected to the system bus 908 via an interface, such as a video adapter 911. A user can interface with computing device 702 via any number of different input devices 903 such as a keyboard, pointing device, joystick, game pad, serial port, and/or the like. These and other input devices are connected to the processors 907 via input/output interfaces 912 that are coupled to the system bus 908, but may be connected by other interface and bus structures, such as a parallel port, game port, and/or a universal serial bus (USB).

Computing device 900 can operate in a networked environment using connections to one or more remote computers through one or more local area networks (LANs), wide area networks (WANs) and the like. The computing device 901 is connected to a network 914 via a network adapter 913 or alternatively by a modem, DSL, ISDN interface or the like.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A system for authenticating computer users comprising:
a first login server disposed in an intranet and adapted to:
  receive and validate a first user's credentials;
  collect at least a first security identifier ("SID") associated with the first user; and
  create a first Security Association Markup Language ("SAML") token, wherein the first SAML token includes the first SID;
a second login server, disposed in a demilitarized zone ("DMZ") associated with the intranet and adapted to:
  receive the first SAML token;
  validate the first SAML token; and
  transform the first SAML token into a second SAML token, wherein the second SAML token includes the first SID and wherein there exists a trust relationship between the first login server and the second login server; and
a web server disposed in the DMZ and adapted to:
  receive a request from a web client for access to an application hosted by the web server, wherein the application authenticates users by comparing SIDs to an access control list;
  receive the second SAML token from the second login server;
  construct a third token at least in part from the first SID; and
  provide the third token to the application for authentication of the first user.

2. The system for authenticating computer users of claim 1, in which the second SAML token an ADFS token.

3. The system for authenticating computer users of claim 1, in which the first and second SAML tokens further include a group SID for the first user.

4. The system for authenticating computer users of claim 1, further comprising a web client, wherein the web client receives the first SAML token as a cookie and sends the first SAML token to the second login server.

5. The system for authenticating computer users of claim 4, in which the cookie is expressed in XML.

6. The system for authenticating computer users of claim 1, wherein the second login server filters the first SID prior to creating the second SAML token.

7. A method for validating a user attempting to access an application hosted on a web server computing device, wherein the web server computing device is located in a demilitarized zone ("DMZ") associated with an intranet, the method comprising the following steps:
  receiving, by the web server computing device located in the DMZ, a request from a web client to access the application, wherein the request is received over an internet connection between the web client and the web server computing device and the web client is not located in the DMZ;
  redirecting the request to a login server located in the DMZ;
  receiving, by the web server computing device, a Security Association Markup Language ("SAML") token, wherein the SAML token includes an assertion containing at least a first security identifier ("SID") associated with the user;
  extracting the SID from the SAML token;
  constructing, by the web server computing device, a second token, wherein the second token is constructed at least in part using the SID and the second token is adapted to allow the application hosted on the web server to compare the SID to an access control list.

8. The method of claim 7, wherein the SAML token is contained in a cookie received from the web client.

9. The method of claim 8, wherein the SAML token is created by the login server and wherein the login server directs the web client to store the SAML token in the cookie.

10. The method of claim 7, wherein the SAML token includes a group SID for the user.

11. The method of claim 7, wherein the SAML token is received from the login server.

12. The method of claim 7, wherein the SID is inserted into an advice element of the SAML token.

13. A system for validating a user attempting to access an application hosted on a web server computing device, wherein the web server computing device is located in a demilitarized zone ("DMZ") associated with an intranet, the web server computing device comprising:

at least one processor;

a memory, communicatively coupled to the at least one processor and containing instructions that, when executed by the at least one processor, perform the following steps:

receiving, by the web server computing device located in the DMZ, a request from a web client to access the application, wherein the request is received over an internet connection between the web client and the web server computing device and the web client is not located in the DMZ;

redirecting the request to a login server located in the DMZ;

receiving, by the web server computing device, a Security Association Markup Language ("SAML") token, wherein the SAML token includes an assertion containing at least a first security identifier ("SID") associated with the user;

extracting the SID from the SAML token;

constructing, by the web server computing device, a second token, wherein the second token is constructed at least in part using the SID and the second token is adapted to allow the application hosted on the web server to compare the SID to an access control list.

14. The method of claim 13, wherein the SAML token is contained in a cookie received from the web client.

15. The method of claim 14, wherein the SAML token is created by the login server and wherein the login server directs the web client to store the SAML token in the cookie.

16. The method of claim 13, wherein the SAML token includes a group SID for the user.

17. The method of claim 13, wherein the SAML token is received from the login server.

18. The method of claim 13, wherein the SID is inserted into an advice element of the SAML token.

* * * * *